Patented Mar. 20, 1923.

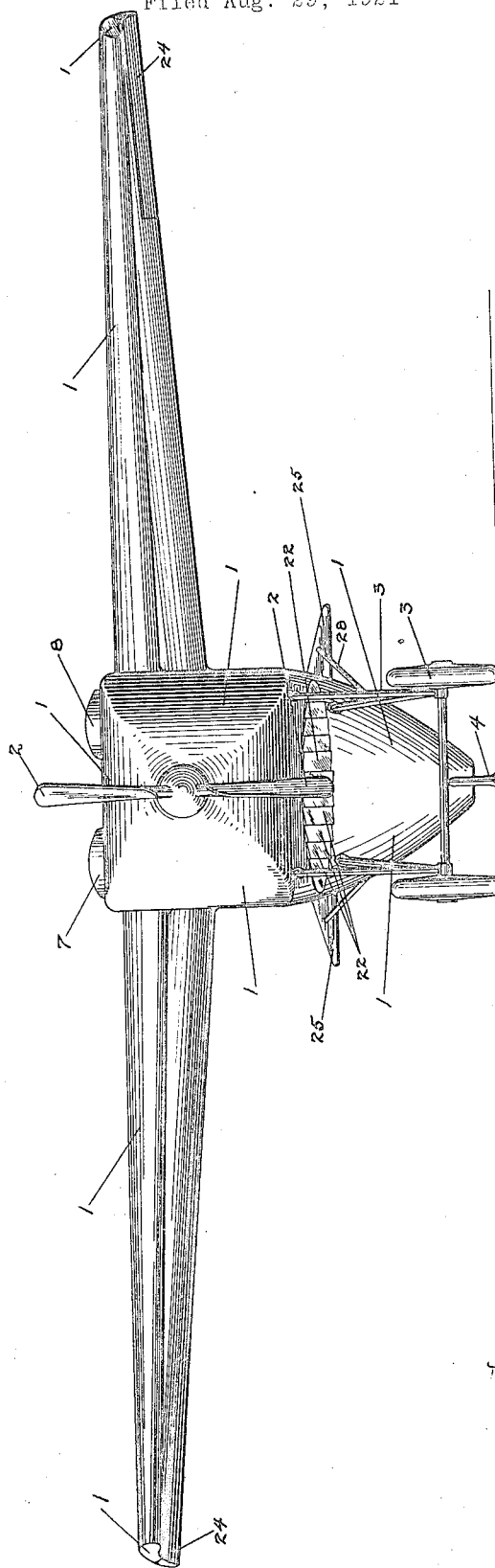

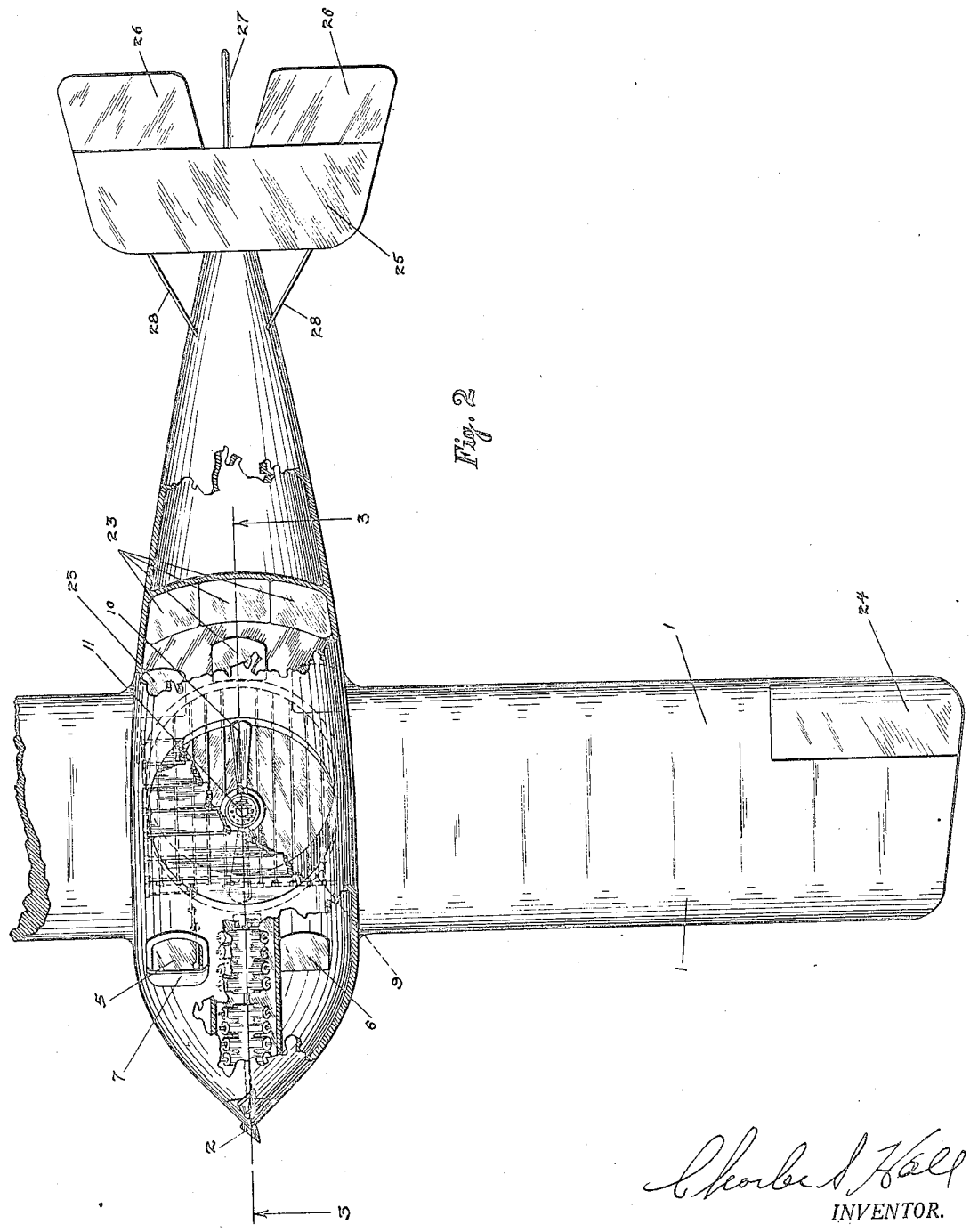

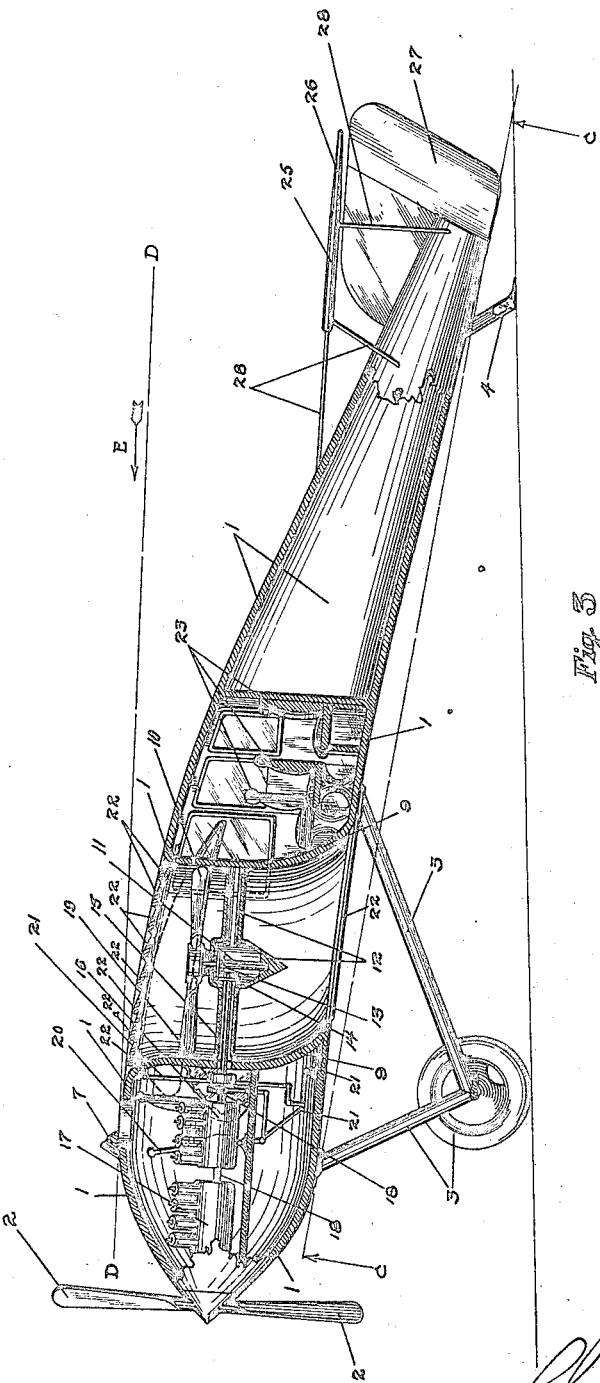

1,449,100

UNITED STATES PATENT OFFICE.

CHARLES S. HALL, OF LOS ANGELES, CALIFORNIA.

AIRCRAFT.

Application filed August 29, 1921. Serial No. 496,530.

*To all whom it may concern:*

Be it known that I, CHARLES S. HALL, a citizen of the United States of America, and a resident of the city of Los Angeles, in the county of Los Angeles, State of California, have invented a new and useful Improvement in Aircraft, of which the following, when read with reference to the accompanying drawings, is such a full, clear, and exact specification as will enable others skilled in the art to which it appertains to make and use the same.

My invention relates generally to the structural and aerodynamical means, and to the arrangement, combination, collocation and co-ordinization of parts by which the air forces, acting directly upon the external surfaces of the aircraft and in combination with the vertical lifting propeller rotatably mounted in a tube constructed within the body of the said aircraft, held in operative relation with the engine by suitable mechanical means, and controllable by the pilot, by which the full power of the engines may be directly utilized, whereby the safety of operation may be increased and the ground speed in both taking off and in landing may be greatly decreased, or entirely eliminated.

The fundamental object of my invention is the placement of a vertical lifting propeller within a tube constructed within the body of the aircraft in such a way that both the upper and lower opening ends of the said tube may be provided with adjustable streamlined shutters so arranged upon pivots and in series that they may tend to open, as well as being mechanically opened, when the vertical lifting propeller is placed in rotation and producing a downward rush of air through the said tube, and tend to close, as well as being mechanically closed, when the said vertical propeller is not in rotation and when the external forces produced by atmospheric reaction, due to inertia above, and to the compression and deflection of air below, the aircraft, whereby the said opening ends of the said tube may, so far as their external surfaces presented by the ends thereof as provided with the said shutters are concerned, become supporting surfaces for the maintenance of the aircraft while in horizontal flight.

A further object of my invention is to provide an aircraft body itself having a camber of sufficient curvature, whereby the downwardly deflected air, following the line of such camber, will react with a tendency to sustain the weight of the aircraft, or a greater part of such weight, when the said aircraft is traveling horizontally and when used in combination with the streamlined shutters as herein further described. The said body being so streamlined as aforesaid, whereby the greater the horizontal velocity, the greater will be the lifting force exerted thereon by atmospheric reaction due to inertia and the deflection thereof due to momentum in accordance with the natural laws and lines of both inertia in the air and the momentum of the aircraft.

Another object of my invention is to provide such a curvature in the upper surfaces of the body thereof that it will, while traveling in forward horizontal direction and by reason of the inertia found in the air, the reduced atmospheric pressure upon the upper surfaces thereof, within the limits of the said atmospheric pressure, directly with the square of the velocity whereby the reaction of such air tending to resume its original state of motion and pressure over this body will afford an increased suction commensurate with the inertia thereof, give greater lifting effects and producing a greater carrying capacity for a given area of external surfaces.

A further object of my invention being to so construct the under surfaces of the body of the aircraft of such a curvature that the downward deflection of the air passing backwardly under the said body, while the said aircraft is in forward motion, will be gradually increased in a hyperbolical progression whereby the deflection produced will conform to the natural laws of both inertia and momentum, as herein more lucidly referred to, and by which the lifting effects produced will be necessarily increased directly with the square of the aircraft velocity.

Another object of my invention is to provide a lifting propeller within a tube constructed within the body of the aircraft in such a way that when the said lifting propeller is placed in motion as a result of its operative relation with the engines, the shutters at the upper and lower openings of the said tube may be held yieldingly upon their pivots so that the downward rush of air through the said tube produced by the rotary motion of the said vertical propeller in operative relation with the engine, will have a tendency to align the said pivotally arranged streamlined shutters within the air stream in such a way that the said shutters individually and collectively will incline themselves upon a line of least resistance.

Another object of my invention is to provide a mechanical means by which the said shutters may automatically adjust themselves within the air stream produced by, and according to, the combined and neutralized relative velocities of the air over, around, through the said tube by the operation of the vertical propeller within the said tube, and under the said body of the said aircraft, according to which the greatest efficiency may thus be acquired with the least given expenditure of engine power and forward motion.

Another object of my invention is to provide a centrally located tube constructed within the central portion thereof vertically and transversely disposed with respect to the normal line of flight; the upper end of the said tube has a forward inclination, and the said tube having a propeller coaxiled and operatively arranged within the said tube by means of which the air conveyed from a forward position may be forced downwardly through and then backwardly out from the said tube thereby gaining a reactionary effect tending to elevate the aircraft as well as to give a forward propulsion thereto.

Other objects of my invention, not at this time more particularly enumerated, will be made lucid from the following detailed description.

This invention is an improvement over Letters Patent No. 1,307,826 dated June 24, 1919, and applications for Letters Patent, Serial No. 376,846 filed April 26, 1920, and No. 464,793 filed April 27, 1921.

With these objects in view I will now describe my invention with reference to the accompanying drawings which form an essential part of this specification.

Figure 1 is a front elevational view of the assembled aircraft, showing the relative arrangement and also showing a perspective view of the arrangement of the shutters over the lower end of the tube constructed in the said body.

Figure 2 is a view looking upon the aircraft from a position directly over the same, with one wing fragmented and showing also fragmented parts and details of the shutter arrangement across the openings of the said tube constructed within the body of the aeroplane.

Figure 3 is a side view of the aircraft with the main portions of the body shell fragmented along, and at 90 degrees angle to, line 3—3 as shown in Figure 2.

In carrying out my invention, in the most adaptable form, an aircraft body 1 is provided with wings built integral therewith and thereon, as shown in Figures 1 and 2. The horizontal propeller 2, as shown in all figures, is rotatively and operatively mounted in the said body of the aircraft. To the said body 1 is attached landing gears 3 and tail skid 4, both of which provide supporting means for the aircraft when in contact with, or resting upon, the ground, all shown in Figures 1 and 3. In the body 1 is constructed pilot seats 5 and 6, as shown in Figure 2. Above and forward of the said pilot seats windshields 7 and 8 are arranged and superimposed upon the aircraft body 1 as shown in different views in Figures 1, 2, and 3. Back of the pilot seats there is constructed within the body 1, tube 9 having a downward inclination and a backward curvature, as shown from a top view in Figure 2 and, in a side view at 90 degrees angle to that of Figure 2, in cross section on line 3—3, in Figure 3.

The vertical lifting propeller 10, as shown in Figures 2 and 3, is rotatively mounted upon vertical shaft 11, as shown in Figures 2 and 3. The said shaft 11 has its lower end journaled within the vertical streamlined gear casing 12 and extends upwardly within the said casing to a point above the same to which the said vertical lifting propeller 10 is attached. Gear 13 is fixed upon the said shaft 11 within the said casing 12 and engaging gear 14. Gear 14 is fixed upon shaft 15 which extends forwardly within and from the said casing 12 and through an opening provided in the wall of the said tube 9. The said casing 12 being securely fastened by any suitable means to the wall of the said tube 9.. Shaft 15 is centralized so as to coincide with the engines 16 and 17, the said engines being arranged in tandem, as shown in Figure 3. To the front end of the engine crank shaft 18 is attached the horizontal propeller 2, by any suitable means. The rear end of the said shaft 18 is attached, by any suitable means, to clutch 19 whereby it may be engaged upon an opposite member attached to shaft 15, the said clutch being operatively and controllably arranged, by any suitable mechanical means, to control lever 20 held in the hands of the pilot, by any means and by controlled mechanism 21, all shown in Figure 3, will open and close the pivotally arranged shutters 22 as the vertical propeller 10 is started or stopped, and will maintain the said shutters yieldingly disposed in the hands of the pilot through the said lever 20.

Attention is called, in this connection, to the fact that the shutters 22, at the upper end of the tube 9, are arranged transversely to the line of flight of the aircraft, while the shutters at the lower end of the said tube are arranged longitudinally with the body of the aircraft, as shown in Figure 1, and all shown in Figure 2.

Body 1 as shown in Figures 2 and 3, is provided with sufficient space and passenger seats 23, in any suitable arrangement with suitable windows, doors and other openings to accommodate the said passengers and for baggage or other articles, these seats, spaces and openings not being particularly shown. On said body 1 is provided ailerons 24 and suitable tail supporting planes 25 with elevators 26 and rudder 27 all held in suitable position by supports 28 and also held in operative control by the pilot by any suitable mechanical means not herein shown and not herein specified.

Attention is further called to one of the essential features of my invention being the camber shown in body 1, as viewed in Figure 3, with reference to the line of the chord C—C. By this camber the air current produced by forward and horizontal flight of the aircraft will follow a line of gradually increasing angle of deflection as it passes backwardly along the line of such camber having a curvature commensurated by, and a line for the production of a deflection according to, the fixed natural law of momentum, as the said air proceeds relatively backwards towards the tail of the aircraft. While this camber may be of greater or less degree in proportion to, and must be commensurated by, the desired altitude and forward speed of the aircraft, no particular amount of camber is hereby specified or intended, as it is known scientifically that camber, in order to produce a given deflection in a given quantity of air at a given pressure and at a given velocity must be varied inversely with the square of the velocity of the aircraft and directly with the units of atmospheric pressure according to altitude, and hence it will be understood that no particular amount of camber is claimed or herein specified in the absence of a specification of weight, velocity and atmospheric pressure.

Line D—D, in Figure 3, is the line of horizontal flight in the direction indicated by arrow E. Relative to this line of flight, it will be seen that the upper surface of the aircraft, by reason of the inertia found in, and the momentum generated by, the air, causes a lifting effect to be produced, by suction, upon the upper surface of the aircraft body as the air passes backwardly along, and according to, the hyperbolical curvature of the said body, and in direct proportion to the atmospheric pressure. This curvature approximates a line produced according to the motion of a body through a resisting fluid, being a neutralization of momentum and friction according to the density, pressure and fluidity of the resisting element.

It is further known scientifically that an aircraft is sustained in flight by the inertia of the air creating a reduction of the atmospheric pressure upon the upper commensuratedly streamline surface, and by the momentum created within the downwardly deflected air along the under surface thereof. The sum of the weight and the velocity of this deflected air, according to its pressure, is in direct proportion to the sum of the weight and velocity of the aircraft, hence it will be seen that as velocity may be varied by units the suction and deflection produced by all supporting surfaces should be varied, according to atmospheric pressure, inversely with the square of the velocity and directly with the units of pressure. This inverse ratio is such that the camber of the lower surface of the body, and the hyperbolical curvature of the upper surface thereof, must be varied inversely according to the square of this velocity and quantitatively and directly with the atmospheric pressure. It will thus be seen that the stream line of the body of the aircraft, such as herein shown, is such that all exposed surfaces, including the upper and lower ends of the tube incasing the vertical lifting propeller when the said ends are closed by the said pivotally arranged shutters, become supporting surfaces according to the natural law of inertia and momentum as aerodynamically applied.

As air resistances must, by reason of the exact correlation of inertia and momentum, vary directly with the atmospheric pressure and by the square of the velocity, as hereinabove stated, and as the horizontal sustenation of the aircraft in flight can only be had by a corresponding correlation of weight and velocity of both the aircraft and the inverse weight and inverse velocity of the air reacted and deflected thereby, it becomes manifest that the streamline surfaces must be commensurated by, and must bear an inverse relation to, the weight and the square of the velocity and a direct relation according to the atmospheric pressure and fluidity.

Expressed in another, and in an aerodynamical form, it may be said that all motion is relative whereby when a given mass of matter, such as an aircraft, moving in a given direction, at a given sum of velocity and in a given time, an equal amount of matter, such as air, must move in an opposite direction, with a like sum of velocity, and with a like interval of time. As such motion, aerodynamically as otherwise, becomes not only relative but also an inseparable binarial environment, associated in time. This binarial environment, measured by and associated with time is of universal application and one obedient to, if not derived from, the natural laws of all motion and must be aerodynamically observed.

Thus it will be seen that the sum of the weight and the velocity of the air displaced by an aircraft must at all times of horizontal flight, be equal as well as opposite to the sum of the weight and the velocity of the air displaced thereby. As thus stated it will be seen that my invention has for its ultimate purpose the aerodynamical observance of the primary principle, if not the cause, according to the laws of inertia and momentum that there may be secured the greatest lifting force and the greatest carrying capacity for a given and quantitative expenditure of engine power by providing an aircraft and by so collocating and arranging its parts and the lines of its construction that all the exposed and horizontal surfaces will be inclined upon and according to the line of the least resistance and commensurated with and proportioned by the atmospheric pressure and fluidity according to the laws of motion and aerodynamical forces whether artificially or naturally generated. It will further be seen that this invention secures the greatest horizontal flight with the greatest carrying capacity for the least given expenditure of mechanical motion and engine power.

It will be understood that no particular arrangement of the engines or size inclination or proportionment of the tube constructed within the body, as I do not wish to be understood as limiting myself to the particular design shown in the accompanying drawings or to the details, arrangement and collocation of parts, as I am aware of the fact that various changes may be made in the camber the size, strength, arrangement, collocation and association of parts, without departing from the spirit of this invention.

Having thus described my invention I claim:

1. In an aircraft having a horizontally streamlined fuselage in combination, a reversely curved tube, a propeller coaxiled within the said tube and operatively arranged so as to induce a backward, downward and backward air current through the fuselage of the said aircraft.

2. In an aircraft having a horizontal streamlined body, a reversely curved tube constructed within the fuselage thereof, the said tube having its longitudinal axis arranged transversely to the normal line of flight, a propeller rotatably mounted within the said tube and coaxiled upon the longitudinal axis so as to induce an air-stream through the said tube.

3. In an aircraft having a horizontal stream-lined body, a reversely curved tube constructed within the fuselage thereof, the said tube having its longitudinal axis arranged vertically with respect to the normal line of flight of the aircraft, a propeller rotatably mounted within the said tube and coaxiled upon the longitudinal axis so as to induce an air-stream through the said tube.

4. In an aircraft having a reversely curved tube constructed within the fuselage thereof, a centrally located lifting propeller coaxiled within the said tube adjacent to the center of gravity of the aircraft, a means of opening the ends of the tube whereby the said propeller may induce an air-stream therethrough, and a means of closing the end of the said tube so as to occlude the said propeller.

5. In an aircraft having an aliferous body of horizontal streamlined proportions, a centrally located tube so constructed within the said body as to encase the center of gravity of the aircraft, the said tube vertically disposed with reference to the normal line of flight having the upper end thereof forwardly inclined, the central portion thereof vertically disposed and the lower end thereof backwardly inclined, an operatively arranged propeller coaxiled and rotatably mounted within the said tube to be used to induce an air-stream backwardly, downwardly and outwardly through the said tube, the said air-stream taking from a relative forward position with respect to the normal line of flight, and passed downwardly parallel to the longitudinal axis of the said tube and then backwardly and outwardly through the lower end of the said tube, the said propeller so acting upon the air-stream tending to lift as well as forwardly propel the aircraft.

6. In an aircraft having an aliferous body of horizontal streamlined proportions, a centrally located tube so constructed within the said body as to encase the center of gravity of the aircraft, the said tube vertically disposed with reference to the normal line of flight having the upper end thereof forwardly inclined, the central portion thereof vertically disposed and the lower end thereof backwardly inclined, and an operatively arranged propeller coaxiled and rotatably mounted within the said tube to be used to induce an air-stream backwardly, downwardly and outwardly through the said tube, the said air-stream taking from a relative forward position with respect to the normal line of flight, and passed downwardly parallel to the longitudinal axis of the said tube and then backwardly and outwardly through the lower end of the said tube, the said propeller so acting upon the air-stream tending to lift as well as forwardly propel the aircraft, and a means of opening and closing the ends of the said tube.

7. In an aircraft comprising an aliferous body, the said body being of streamlined proportions paralleling the longitudinal dimensions thereof, a tube constructed therein having its longitudinal axis vertically and transversely arranged with reference to the normal line of flight of the aircraft, the said tube being so located within the said aircraft as to encase the center of gravity of the said aircraft, a centrally located and operatively arranged propeller coaxiled within the said tube and used to induce an air-stream through the said tube paralleling the longitudinal dimensions thereof, the upper end of the said tube being forwardly disposed so as to take the air by suction from a direction substantially paralleling the line of flight and inducing the same downwardly through the said tube and outwardly through the lower end thereof which lower end is backwardly disposed so as to induce the air-stream in a backward direction with respect to the normal line of flight to secure therefrom a propeller effort.

8. In an aircraft comprising an aliferous body, the said body being of streamlined proportions paralleling the longitudinal dimensions thereof, a tube constructed therein having its longitudinal axis vertically and transversely arranged with reference to the normal line of flight of the aircraft, the said tube being so located within the said aircraft as to encase the center of gravity of the said aircraft, a centrally located and operatively arranged propeller coaxiled within the said tube and used to induce an air-stream through the said tube paralleling the longitudinal dimensions thereof, the upper end of the said tube being forwardly disposed so as to take the air by suction from a direction substantially paralleling the line of flight and inducing the same downwardly through the said tube and outwardly through the lower end thereof which lower end is backwardly disposed so as to induce the air-stream in a backward direction with respect to the normal line of flight to secure therefrom a propeller effort, and a means of opening and closing the ends of the said tube.

9. In an aircraft comprising an aliferous body, the said body being of streamlined proportions paralleling the longitudinal dimensions thereof, a tube constructed therein having its longitudinal axis vertically and transversely arranged with reference to the normal line of flight of the aircraft, the said tube being so located within the said aircraft as to encase the center of gravity of the said aircraft, a centrally located and operatively arranged propeller coaxiled within the said tube and used to induce an air-stream through the said tube paralleling the longitudinal dimensions thereof, the upper end of the said tube being forwardly disposed so as to take the air by suction from a direction substantially paralleling the line of flight and inducing the same downwardly through the said tube and outwardly through the lower end thereof which lower end is backwardly disposed so as to induce the air-stream in a backward direction with respect to the normal line of flight.

10. In an aircraft comprising an aliferous body, the said body being of streamlined proportions paralleling the longitudinal dimensions thereof, a tube constructed therein having its longitudinal axis vertically and transversely arranged with reference to the normal line of flight of the aircraft, the said tube being so located within the said aircraft as to encase the center of gravity of the said aircraft, a centrally located and operatively arranged propeller coaxiled within the said tube and used to induce an air-stream through the said tube paralleling the longitudinal dimensions thereof, the upper end of the said tube being forwardly disposed so as to take the air by suction from a direction substantially paralleling the line of flight and inducing the same downwardly through the said tube and outwardly through the lower end thereof which lower end is backwardly disposed so as to induce the air-stream in a backward direction with respect to the normal line of flight, and a means of opening and closing the ends of the said tube.

11. In an aircraft having an aliferous body of aerofoil suction paralleling the longitudinal dimensions thereof and paralleling the normal line of flight, a centrally located tube so constructed within the said propeller as to encase the center of gravity of the said aircraft, as a whole, the said tube having the upper end thereof forwardly curved while the central portion is downwardly disposed transversely to the normal line of flight, and the lower end thereof backwardly curved, the said tube having a propeller coaxiled within the central portion thereof and so operatively arranged as to induce a flow of air through the said tube paralleling the longitudinal axis thereof.

12. In an aircraft having an aliferous body of aerofoil suction paralleling the longitudinal dimensions thereof and paralleling the normal line of flight, a centrally located tube so constructed within the said propeller as to encase the center of gravity of the said aircraft, as a whole, the said tube having the upper end thereof forwardly curved while the central portion is downwardly disposed transversely to the normal line of flight, and the lower end thereof backwardly curved, the said tube having a propeller coaxiled within the central portion thereof and so operatively arranged as to induce a flow of air through the said tube paralleling the longitudinal axis thereof, and a means of opening and closing the upper and lower ends of the said tube.

In testimony whereof I have signed my name to this specification.

CHARLES S. HALL.